US007002322B1

(12) United States Patent
Davies et al.

(10) Patent No.: US 7,002,322 B1
(45) Date of Patent: Feb. 21, 2006

(54) MODULATED POWER SUPPLY

(75) Inventors: Dorian Davies, Bishops Stortford (GB); Graham Dolman, Saffron Walden (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/743,972

(22) Filed: Dec. 23, 2003

(51) Int. Cl.
*G05F 1/652* (2006.01)

(52) U.S. Cl. ....................................... 323/222; 330/155

(58) Field of Classification Search ................ 323/222; 330/136, 10; 341/155
See application file for complete search history.

(56) References Cited

U.S. PATENT DOCUMENTS

| | | | | |
|---|---|---|---|---|
| 4,384,321 A * | 5/1983 | Rippel | ........................ | 363/124 |
| 5,861,777 A * | 1/1999 | Sigmon et al. | ............. | 330/136 |
| 5,886,572 A * | 3/1999 | Myers et al. | ................. | 330/10 |
| 6,292,378 B1 * | 9/2001 | Brooks et al. | ................ | 363/65 |
| 6,795,009 B1 * | 9/2004 | Duffy et al. | ................ | 341/155 |
| 6,850,045 B1 * | 2/2005 | Muratov et al. | ............ | 323/272 |
| 6,922,044 B1 * | 7/2005 | Walters et al. | ............. | 323/288 |

* cited by examiner

*Primary Examiner*—Bao Q. Vu
(74) *Attorney, Agent, or Firm*—Barnes & Thornburg LLP

(57) ABSTRACT

A modulated power supply comprises first and second coding units. The second coding unit is responsive to a feed-forward error signal representing the error between the coded output of the first coding unit and an input modulating signal. The second coding unit codes for the more limited range of the error signal, thereby improving resolution. The first coding unit can comprise M coding units arranged in parallel with one another. The M coding units are operated in a manner which increases the apparent number of quantisation levels. This is achieved by feeding a modified version of the input modulating signal to each of the M coding units or by offsetting by quantisation grids of the M coding units. The improvements are particularly useful for improving performance where the input modulating signal has a wide bandwidth.

18 Claims, 10 Drawing Sheets

MODULATED POWER SUPPLY

FIELD OF THE INVENTION

This invention relates to modulated power supplies.

BACKGROUND TO THE INVENTION

Modulated power supplies, such as Pulse Width Modulated (PWM) power supplies, are widely used in a variety of applications. In a PWM power supply a power switching device, such as a power transistor, is turned on and off at a high frequency, with the width of the 'on' periods varying in sympathy with the amplitude of a modulating input signal. The resulting train of output pulses from the switching device is smoothed by a low pass filter to deliver a supply voltage which varies in sympathy with the modulating input signal.

A PWM power supply can have a single phase or multiple phases, with the contributions of individual phases summing to provide an overall output. Multi-phase PWM power supplies have an advantage over single phase PWM supplies in that they can deliver better resolution in the time domain and increased current. It should be noted that the term 'phase' relates to apparatus which receives an input signal and operates a switching device rather than a phase in an electrical sense.

One known application of a modulated power supply is in supplying power to a power amplifier. An envelope of the signal which is to be amplified is used as a modulating signal for the power supply and the resulting, modulated, power supply signal is fed to the power amplifier. In this way, the power supply signal follows the envelope of the signal to be amplified and the efficiency of the power amplifier can be improved.

In a pulse width modulated system, there are several constraints. The sampling rate for each phase, i.e. the rate at which the amplitude of the modulating signal is sampled, must be at least twice the highest frequency of the modulating signal to avoid aliasing effects. This imposes a lower limit on the sample rate. The switching devices have a finite frequency range over which they can be operated before they begin to exhibit non-ideal behaviour, and this determines the maximum rate at which the switching devices can be turned on and off. A combination of the sample rate and maximum switching rate determine the range of discrete pulse widths that a coding unit of the PWM supply can assign to the switching signal. When the modulating signal has a wide bandwidth this forces the sampling rate to be high and results in a limited range of coding values for the PWM coder. This limits the resolution, in terms of amplitude, of the final output signal. As an example, the base stations in a third generation, two channel Universal Mobile Telecommunications System (UMTS) are expected to transmit and receive signals having a bandwidth of around 10 MHz. Assuming a sampling rate of 20 MHz and a maximum switching rate of 160 MHz, this only allows the PWM coder to have a set of eight different coding values (pulse widths). Thus, the amplitude of the output signal, at any point in time, can only be resolved to one of eight different values.

Accordingly, the present invention seeks to improve the performance of a modulating power supply particularly, but not limited to, situations where the modulating signal has a wide bandwidth.

SUMMARY OF THE INVENTION

A first aspect of the present invention provides a control apparatus for a modulated power supply comprising: an input for receiving a modulating signal; a first coding unit which is arranged to receive the modulating signal and to generate a first control signal for controlling a first switching stage, the first control signal being related to the value of the modulating signal; an error determining unit which is arranged to determine an error signal resulting from the difference between the modulating signal and the first control signal; a second coding unit which is arranged to receive the error signal and to generate a second control signal for controlling a second switching stage, the second control signal being related to the value of the error signal.

By providing a second coding unit which is responsive to the error signal, it is possible to reduce the overall error of the coded control signals, even in situations where the modulating signal has a wide bandwidth. Preferably, the second coding unit has a set of possible coding values which are substantially distributed across the range of the error signal. This allows the error to be coded to a resolution which is greater than that used in the first coding unit, and to a resolution which may not otherwise be possible.

The first and second coding units can be single phase coding units or multiple phase coding units. Where multiple phase units are used, the error determining unit sums contributions of the set of control signals on a periodic basis. Preferably, the summed signal is filtered before comparison with the modulating signal.

Further feed-forward error stages can be provided as desired.

A second aspect of the present invention provides a modulated power supply comprising: an input for receiving a modulating input signal; a processing unit which is arranged to receive the modulating signal and to generate M modified modulating signals; M coding units arranged in parallel with one another, each coding unit being arranged to receive one of the modified modulating signals and to generate a control signal for controlling a switching stage, the control signal being related to the value of the modified modulating signal; wherein each of the coding units comprises a set of quantisation levels which are used to code the modified modulating signal and the M modified modulating signals are offset from one another by substantially 1/M of a quantisation level.

A third aspect of the present invention provides a control apparatus for a modulated power supply comprising: an input for receiving a modulating input signal; M coding units arranged in parallel with one another, each coding unit being arranged to receive the modulating signal and to generate a control signal for controlling a switching stage, the control signal being related to the value of the modified modulating signal; wherein each of the coding units comprises a set of quantisation levels which are used to code the modified modulating signal and the sets of quantisation levels of the M coding units are offset from one another by substantially 1/M of a quantisation level.

The second and third aspects of the invention produce an equivalent effect to the coding units operating with twice the number of quantisation levels that they actually have. This is particularly useful in applications using high bandwidth modulating signals where it is not possible for the coding units to be operated at a higher resolution, but an increase in resolution is desirable.

The second and third aspects of the invention can be used on their own, or in combination with the first aspect of the invention.

The power supply can be used in a wide range of applications. It is particularly well suited to wireless telecommunications base stations where power amplifiers in the transmit chains are required to amplify a signal having a wide bandwidth. This is particularly true in third generation Universal Mobile Telecommunications System (UMTS) base stations. The input modulating signal to the power supply can be an envelope of a signal to be transmitted and the output of the power supply can form the power supply to a power amplifier, so that the power supply tracks the envelope of the input signal.

Further aspects of the invention provide a power amplifier which includes such a modulated power supply, a wireless base station comprising the power amplifier, a control apparatus for a multi-phase pulse width modulated power supply, a method of operating a multi-phase pulse width modulated power supply and a method of generating a power supply signal.

A still further aspect of the invention provides software for implementing a method of controlling operation of a modulated power supply. The software can be stored on a suitable storage medium such as an electronic memory device, hard disk, optical disk or other machine-readable storage medium and will be executed by a suitable processing device on the host device. The software may be delivered on a machine-readable carrier or it may be downloaded directly to the host device via a network connection. It will be appreciated that the software may be installed at any point during the life of the host device.

BRIEF DESCRIPTION OF THE DRAWINGS

Embodiments of the invention will be described with reference to the accompanying drawings in which.

DESCRIPTION OF PREFERRED EMBODIMENTS

Figure 1:
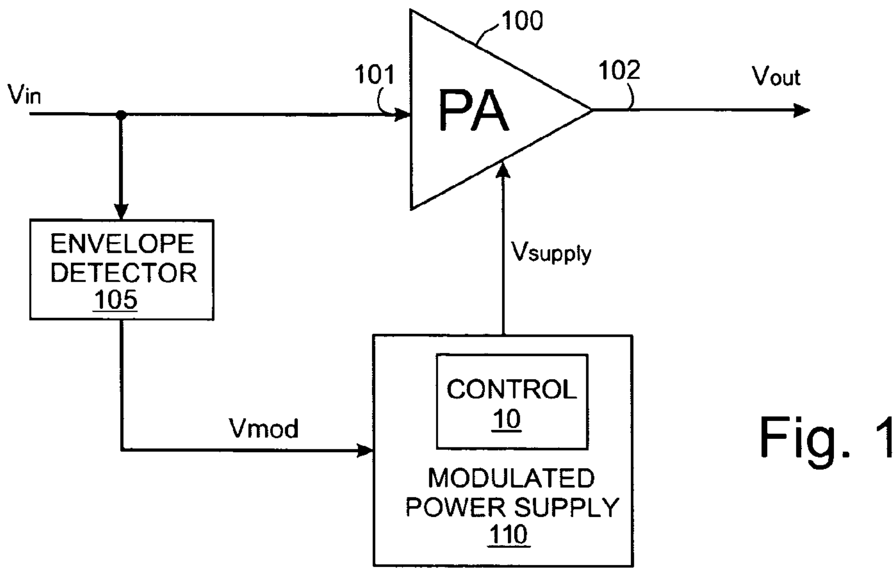
FIG. 1 shows a modulated power supply for use with a power amplifier.
Figure 2:
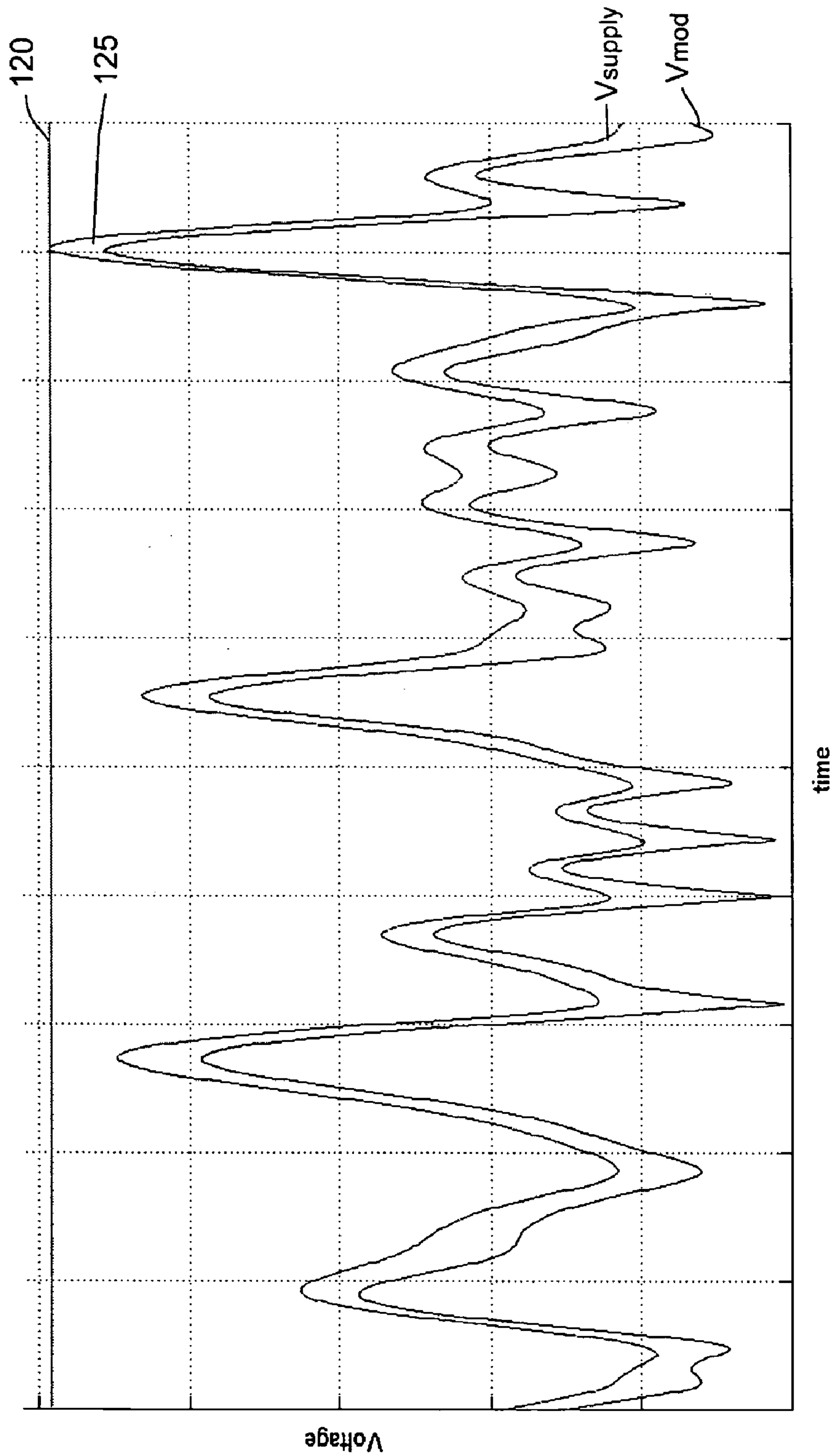
FIG. 2 shows operation of the arrangement of FIG. 1.

Before describing the invention in detail, FIGS. 1 and 2 illustrate an application of the invention in order to put the invention into context. FIG. 1 shows a power amplifier arrangement comprising a power amplifier 100 and a modulated power supply 110. An input signal $V_{in}$, which is to be amplified by the power amplifier 100, is also applied to an envelope detector 105. A signal, $V_{mod}$, representing the envelope of the input signal is applied to an input 101 of the modulating power supply 110. A control circuit 10 within the modulating power supply 110 receives the signal $V_{mod}$ and determines appropriate control signals which cause the power supply 110 to generate a supply voltage $V_{supply}$ which substantially tracks $V_{mod}$. An amplified output signal $V_{out}$ is taken from an output 102 of the power amplifier 100. FIG. 2 shows the operation of the power supply over a period of time, showing the envelope of the input signal $V_{mod}$ and the envelope of the dynamically modulated power supply voltage $V_{supply}$. It can be seen that the power supply voltage tracks the signal envelope, including peaks 125. As a comparison, the power supply voltage of a fixed supply is shown by line 120. The power supply 110 and control circuit 10 are of the type previously described.

Figure 3:
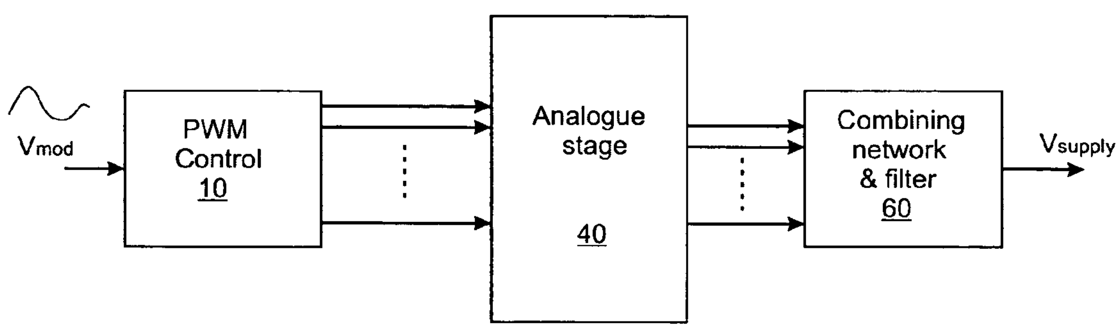
FIG. 3 shows an overview of a PWM power supply.

FIG. 3 is an overview of the main stages of the PWM power supply 110. A PWM control stage 10 receives a modulating input signal $V_{mod}$. The control stage 10 generates a set of pulsed control signals for operating switching devices in analogue stage 40, the width of the output signals being related to the amplitude of the modulating signal. The control stage is shown in more detail in FIG. 4 and will be described below. Analogue stage 40 includes a set of analogue switching devices and drive circuits for the switching devices, as shown in more detail in FIG. 10. An output stage 60 combines the outputs of the switching devices and filters the combined output to derive an overall output $V_{supply}$.

Figure 4:
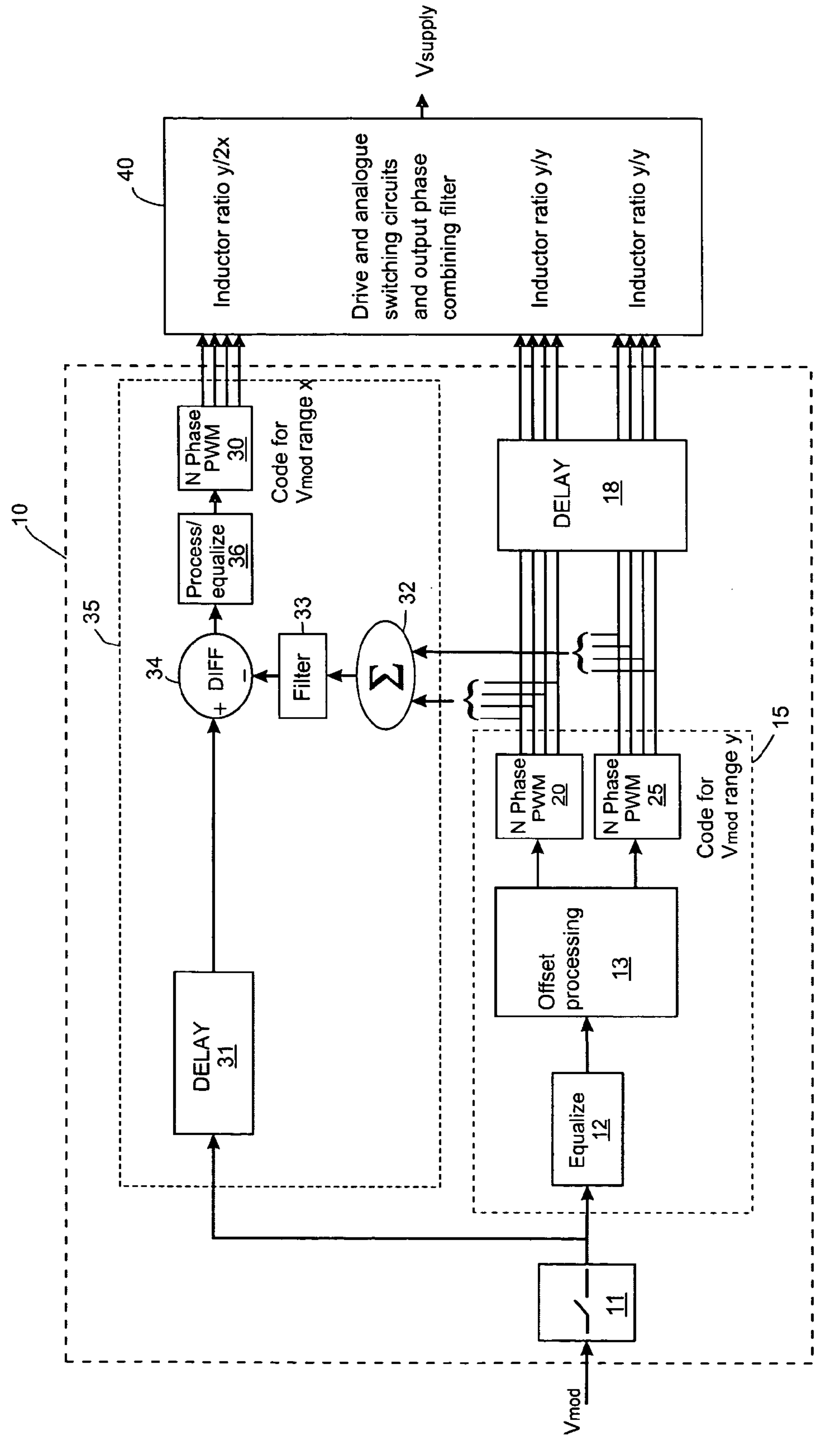
FIG. 4 shows the control stage of the supply of FIG. 3.

Referring to FIG. 4, this shows the control stage 10 of the PWM supply. A modulating signal $V_{mod}$ is applied to an input of the control stage. The modulating signal is sampled 11 to derive a sequence of digital multi-bit words representing sampled values of the amplitude of the modulating signal $V_{mod}$. The control stage 10 comprises two main blocks 15, 35. Block 15 receives the sequence of sample values representing $V_{mod}$ and performs any equalization 12, if necessary. It then modifies the value of the samples by offset processing unit 13. Two outputs, representing modified sequences of samples values are fed to two N phase PWM coding units 20, 25 which are arranged in parallel with one another. The N phase coding units 20, 25 each generate N control signals for operating switching devices in the analogue stage 40. These coding units 20, 25 supply the main component of the eventual output signal and will be termed the most significant bit (MSB) outputs. A second block 35 represents a feed forward error correction loop. Outputs of the two N phase coding units 20, 25 are compared with the modulating input signal $V_{mod}$ to derive a signal representing the error between the coded value of the MSB outputs and the modulating input signal. This error signal is applied as a modulating signal to a further PWM coding unit 30 having N phases. As the error signal has a much smaller range than the modulating input signal $V_{mod}$ the N phase PWM coding unit 30 can code for a more restricted signal range than coding units 20, 25 in the main path. The N phase coding unit 30 generates N control signals for operating switching devices in the analogue stage 40. This coding unit 30 supplies a smaller component of the eventual output signal and will be termed the least significant bit (LSB) output.

Figure 5:
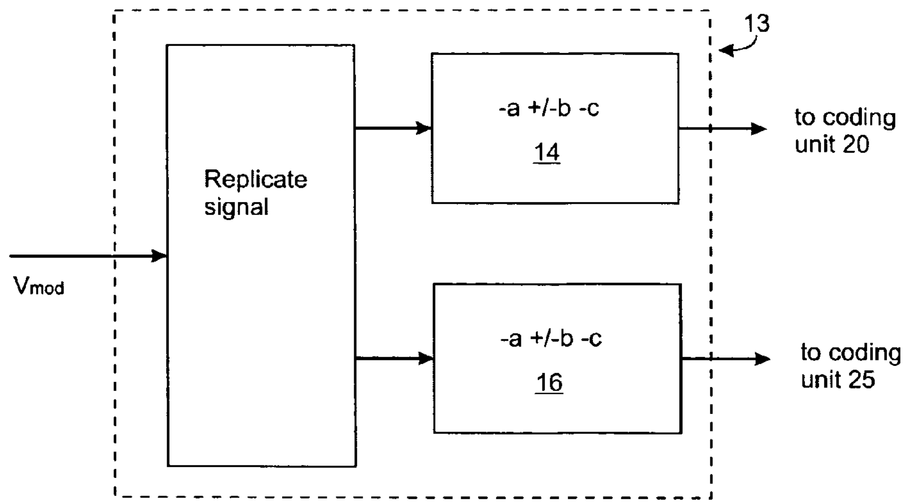
FIG. 5 shows an offset processing part of the control stage of FIG. 4.

The operation of the offset processing unit 13 will now be described. For the reasons described above, there is a restriction on the number of discrete widths that the coding units 20, 25 can assign to the control signals, which restricts the resolution of the eventual output signal. Offset processing unit 13 increases the accuracy of the coded signal without increasing the number of discrete values. FIG. 5 shows the main functions of the offset processing unit 13. Firstly, the modulating signal $V_{mod}$ is replicated and applied to units 14, 16. At this stage, the modulating signal is represented by a series of multi-bit (e.g. 10 bit) words, each multi-bit word representing the amplitude of the modulating signal at a sample time. Each unit modifies the value of the modulating signal. In this embodiment, each unit modifies the value of the modulating signal by the expression:

−a+/−b−c wherein:

- a is a factor to adjust for the rounding scheme used;
- b is an offset constant equal to quantization step/(2*number of coder blocks)=Q/2M. In the described embodiment there are two coder blocks 20, 25 so b=Q/(2*2)=Q/4;
- c is an offset to ensure that the error path signal is always positive.

Figure 6:
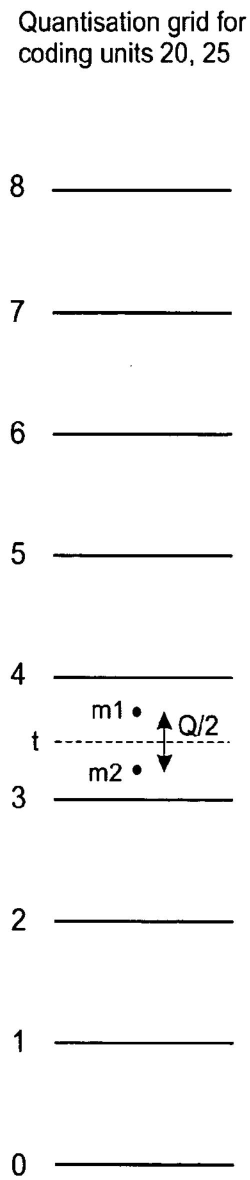
FIG. 6 shows the effect of applying an offset to the modulating signal.

The most important factor is b, which has a value of one quarter of a quantisation step, which will be called Q/4. Unit 14 modifies the value of '+b' while unit 16 modifies the value by '−b'. After N successive samples have been modified in this way, the operation of units 14, 16 alternates so that unit 14 modifies the value by '−b' while unit 16 modifies the value by '+b'. FIG. 6 shows the quantisation grid for coding units 20, 25. Eight quantisation levels 0–8 are shown. Each coding unit 20, 25 compares the value of the modulating signal with the quantisation grid and assigns the closest level. Each quantisation level is associated with a code representing a pulse width of the output control signal. Looking at just one pair of quantisation levels '3' and '4', there is an intermediate value 3.5, labelled as a threshold t. In normal operation, a coding unit quantises a signal which is below the value 3.5 as 3.0 and a signal which is above the threshold value 3.5 as 4.0. Coding units 20, 25 both operate in this manner. It can be seen that the maximum quantising error, i.e. the error between the actual value of the input and the coded output value, is one half of a quantisation step of Q/2. The effect of adding or subtracting Q/4 to a signal is best described by way of some examples. For simplicity, the difference Q between two quantisation levels will be taken as having a value of 1.

In a first example, the input signal has a value of 3.0. Offset unit 13 generates two output signals with the values:

(i) 3.0+Q/4 (0.25)=3.25

(ii) 3.0−Q/4 (0.25)=2.75

These are both quantised by coding units 20, 25 as 3.0, representing an error of 0.

In a second example, illustrated in FIG. 6, the input signal has a value of 3.5. Offset unit 13 generates two output signals with the values.

(i) 3.5+Q/4 (0.25)=3.75 (shown as m1)

(ii) 3.5−Q/4 (0.25)=3.25 (shown as m2)

These are quantised by coding units 20, 25 as 4 and 3 respectively. The average output value is 3.5, which is the true value, representing an error of 0.

In a third example, the input signal has a value of 3.75. Offset unit 13 generates two output signals with the values:

(i) 3.75+Q/4 (0.25)=4.0

(ii) 3.75−Q/4 (0.25)=3.5

These are quantised by coding units 20, 25 as 4.0 and 3.0, representing an error of 0.25 (Q/4).

It can be seen that when the outputs of the coding units 20, 25 are combined the maximum quantisation error is Q/4 (Q/2M), rather than Q/2 as in a conventional system. Thus, the effect is that the coding units have a resolution of twice their actual resolution. Changing the offset after every N samples (i.e. changing from adding Q/4 to subtracting Q/4) has the effect of balancing the two sets of parallel phases.

The values of a and c depend on the method of implementation and can have a value of zero. Constant 'a' is equal to one half of a quantisation level and is a result of the signal rounding into the control unit 20. If the signal is rounded up (ceiling function) then 'a' must be subtracted; if the signal is rounded to the nearest integer then 'a' is not required; if the signal is rounded down or truncated (floor function) then 'a' must be added. Offset 'c' is used to ensure such that the error path signal is always positive. A further function of the processing unit 13 is to ensure that the error signal is always positive and to compensate for any DC offsets introduced by the system. The reason for ensuring a positive error is because, for a high efficiency supply, it is only possible to add power to the output and not to subtract it. The output switching devices switch between a high level (e.g. 35 V) and 0 V and can be on or off, i.e. they add power or add nothing. Although it may, in principle, be possible to subtract power by sinking power within the power supply to effect a negative error, this would degrade efficiency of the supply.

All of the outputs of the coding units 20, 25 are delayed by a delay element 18. The purpose of delay element 18 is to time-align the PWM signals output by units 20, 25 with the PWM signals emitted by coding unit 30.

Referring back to FIG. 4, the feed-forward error correcting loop 35 will now be described. Each of the N phase PWM coding units 20, 25 outputs a set of PWM signals. The two sets of signals are fed to a summing unit 32. The summing unit 32 sums the outputs of the two N phase coding units 20, 25 on a bit-by-bit basis. Referring to the lower part of FIG. 9, this shows operation of one of the coding units 20, 25. Each phase of the coding unit outputs a pulsed signal, the width of the pulse varying in accordance with the required output signal. For each of the sample periods (occurring at a rate of 2 Fs) the summing unit 32 sums the four individual 1-bit signals from this coding unit together with the four individual 1-bit signals from the other coding unit. Each sample period represents one of the columns marked 37 in FIG. 9. The resulting summed signal is then filtered by a low pass filter 33. The low pass filter converts the summed signal, which has a stepped profile, into a smoother signal. Unit 34 takes the difference between the output of filter 33 and a delayed version of the original modulating signal $V_{mod}$.

The value of the delay element 31 is chosen so that the two signals compared by unit 34 are aligned in time, i.e. the delayed version of $V_{mod}$ is aligned with the filtered signal representing $V_{mod}$ at the same instant in time. The value of the delay element 31 represents the delay due to processing in units 12, 20, 25, 32 and 33. The output of unit 34 will be called the error signal, $V_{error}$. The range of the error signal is a fraction of the total range of $V_{mod}$.

Figure 7:
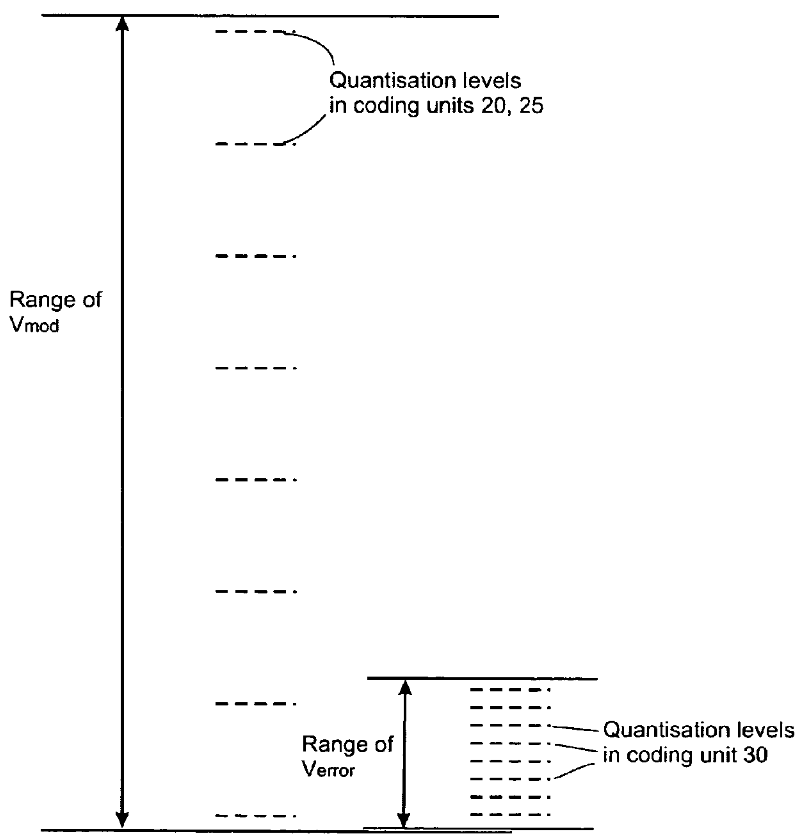
FIG. 7 shows the range of the main modulating signal and the error signal.

Referring to FIG. 7, this shows the overall range of $V_{mod}$ and how the quantisation levels used by coding units 20, 25 are distributed across the range of $V_{mod}$. The right-hand side of FIG. 7 shows the likely range of the error signal $V_{error}$. Coding unit 30 codes the error signal in a similar manner to units 20, 25. However, coding unit 30 applies a different range of coded values to units 20, 25. Coding unit 30 exploits the knowledge that the maximum range of the error signal is much smaller than the range of the signal applied to units 20, 25. The quantisation levels are only distributed across the expected range of the error signal $V_{error}$. This allows the set of discrete values that the coding unit 30 assigns to the error signal to be spaced more closely together and hence the resolution of the eventual signal, in terms of amplitude, is increased. In a practical embodiment with two 4 phase coding units 20, 25 each having 8 quantisation levels distributed over a 35 V range, coding unit 30 has a set of 8 quantisation levels distributed over a signal coding range of 4.5 V. The normal range of the error signal has been found to be around 3 V. While the coding range of 4.5 V exceeds the theoretical range for the error signal, this provides a margin for unexpected results and avoids the error signal exceeding the available coding range.

In this example, coding units 20, 25, 30 each have the same number of quantisation levels. However, coding unit 30 could have a different number of levels than coding units 20, 25. Also, there can be two coding units 30 arranged in parallel with one another, with the same form of offset processing as described in relation to coding units 20, 25.

Figure 8:
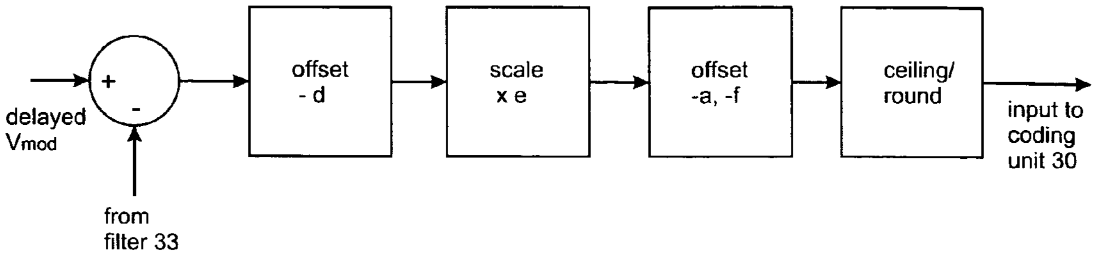
FIG. 8 shows a processing function in the error correction loop.

FIG. 8 shows how the difference (error) signal is processed by unit 36 before it is applied to coding unit 30. The signal may also be equalized. The main adjustment is to scale the error signal by a factor e so that the error signal has the same range as the signal applied to the main coding units 20, 25. Factor e has a value of:

$$e = \frac{\text{range of } V_{mod}}{\text{range of } V_{error}}$$

Taking the example of $V_{mod}$ having a range of 35 V and $V_{error}$ having a range of 4.5 V, then factor e has a value of 35/4.5. The reason for scaling the error signal in this way is to allow the switches in the main and error paths of the subsequent analogue stage (shown in FIG. 10) to be driven by a common supply rail. As described below, inductor values in the subsequent combining network and filter are adjusted so that the contribution of the error path is scaled back to it's proper value. Referring again to FIG. 8, the other factors shown are:

d=offset equivalent to the minimum error value.

a=half a quantisation step, as previously described f=offset for DC alignment.

Factors a, d and f may have a value of zero, and vary according to implementation.

Figure 9:
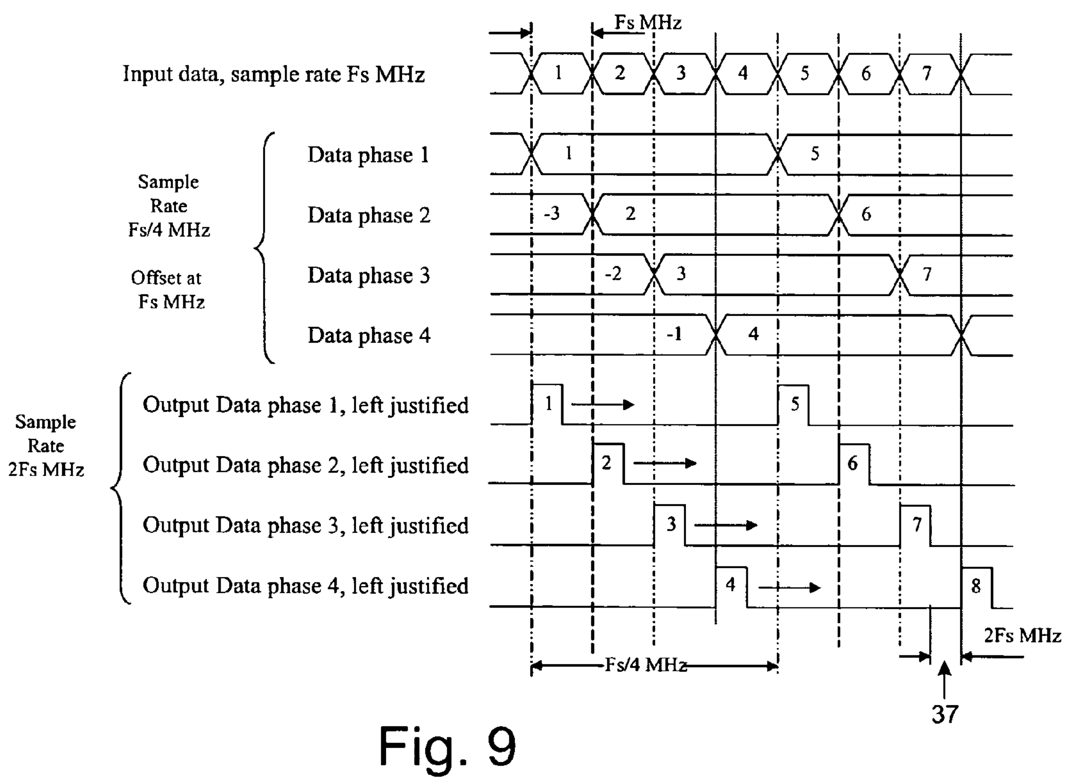
FIG. 9 shows operation of one of the coding units within the control stage.

FIG. 9 shows a timing diagram of the operation of one of the multi-phase PWM coding units 20, 25, 30. The input signal Vmod is sampled at a sampling rate Fs. At each sampling point the sampling unit 11 determines the amplitude of the input modulating signal and assigns the sample a multi-bit digital code. In the same manner as a conventional digital-to-analogue converter, the coding unit has a finite number of discrete values that can be assigned to the sample and the coding unit assigns the code which is closest to the sampled amplitude. Multi-bit samples are conveyed in blocks at a rate of Fs, shown in the top line of FIG. 9 as blocks numbered '1' to '7'. A serial to parallel converter divides the incoming sample data into four streams, one for each phase. The data in sample 1 is sent to a coding unit for phase 1, the data in sample 2 is set to a coding unit for phase 2, and so on. In this example each phase is offset by a time period equal to Fs and each sample is delivered at Fs/4 as there are four phases in total. The blocks numbered '−3', '−2', '−1' are data from earlier samples, which precede the blocks '1' to '7' shown on the top line.

In FIG. 9, each of the coding units generates a signal which can take one of 8 different widths, representing a resolution of 2 Fs. Preferably, the relationship between the input signal (sample data) and code value (pulse length) is linear although, in some circumstances, a non-linear relationship may be desired. In a practical realisation for a wideband CDMA system, an input signal has a bandwidth of 10 MHz and Fs=80 MHz.

Figure 10:
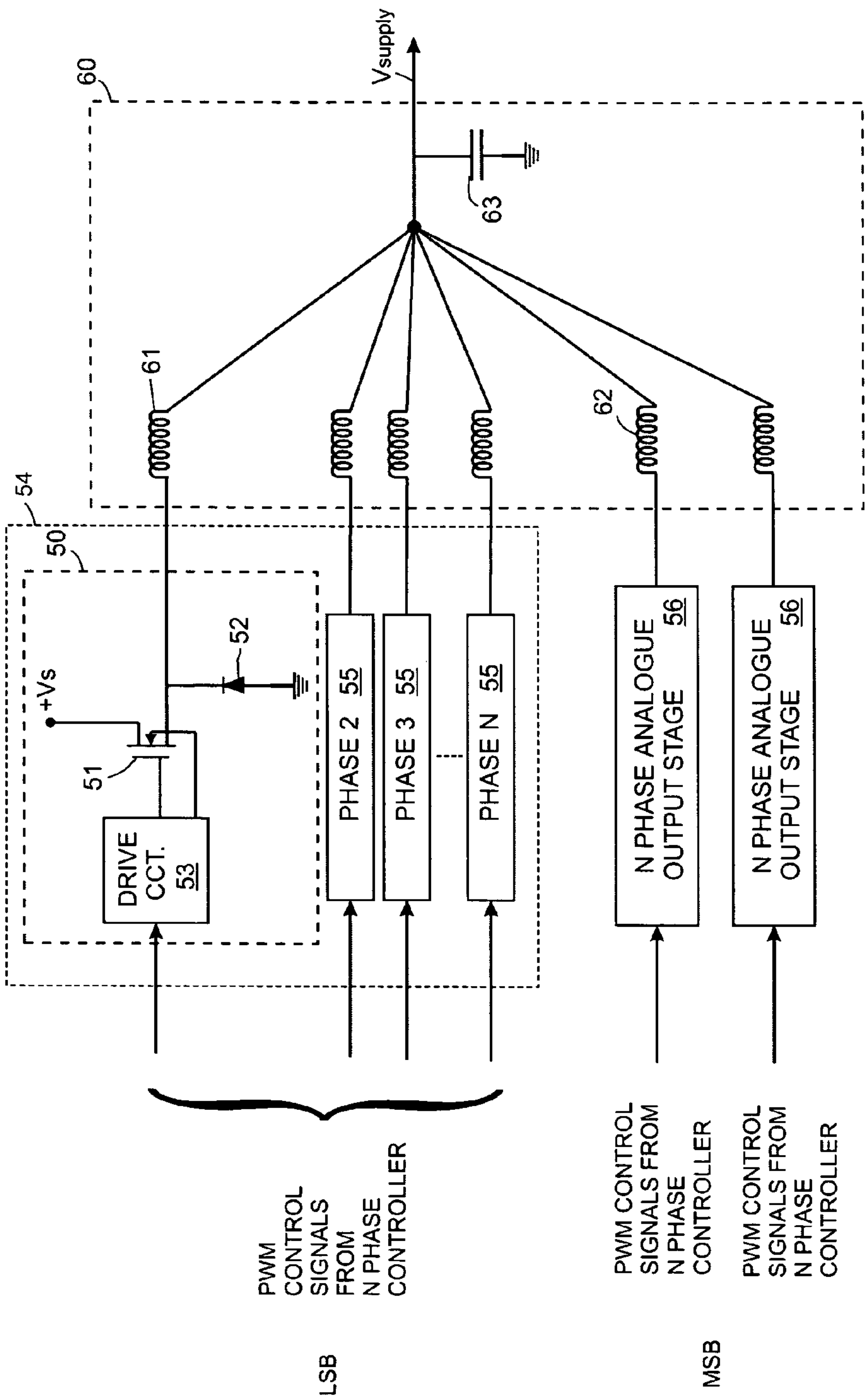
FIG. 10 shows the analogue stage of the power supply of FIG. 3.

The analogue stage 40 is shown in FIG. 10. The multi-phase stages representing the most significant bits (MSB) and least significant bits (LSBs) generally have the same form. For clarity, only one of the phases 50 representing part of the group of N phases 54 is shown in detail. Other phases 55 of the multi-phase group have the same form. The first phase 50 comprises a power switching device 51, which can be a Field Effect Transistor (FET) or any other suitable switching device. Device 51 is connected between a positive supply rail +Vs and an output. A diode 52 connects between the switching device 51 and ground and provides a bypass path for current when the device is turned off, as is well known. In an alternative form, a phase can have a negative supply rail (−Vs) or two switching devices which are connected in a parallel, 'totem pole' arrangement between a positive supply rail +Vs and a negative supply rail −Vs, with diodes placed in parallel with each device and an output being taken from the point between both devices. Each phase also includes a drive circuit 53. The control signal output by coding unit 30, which is typically implemented as a FPGA, is at a low level which is unsuitable for directly driving the switching device 51. Therefore, drive circuit 53 converts the control signal to a suitable level for driving the switching device 51.

Outputs of the N phases are summed and low-pass filtered by an output stage 60 comprising a network of inductors 61, 62 and a capacitor 63. More complex output stages can be implemented than the one shown here, as is well known in the art. The values of inductors 61 used for the LSB outputs differ from the inductors 62 used for the MSB outputs. The LSB outputs are intended to make a much smaller contribution than the MSB outputs. However, it is preferred that the LSB analogue stage is driven by the same supply rails, for simplicity of design and efficiency of operation. Thus, the inductor values are altered so that when a switching device 51 is operated in one of the LSB stages 50, 55, it contributes a proportionally smaller signal compared to the MSB stages. The ratio of the inductor values is:

$$\left(\frac{\text{main coder range } (y)}{\text{error coder range } (x)}\right)\cdot\left(\frac{\text{number of error phases}}{\text{number of main phases}}\right)$$

For the embodiment shown, with a main coder range of 35 V and an error coder range of 4.5 V, 8 main phases and 4 error phases, this equates to an inductor ratio of:

$$\frac{y}{x}\cdot\frac{4}{8}=-\frac{y}{2x}=\frac{35}{4.5*2}=3.88$$

Figure 11B:
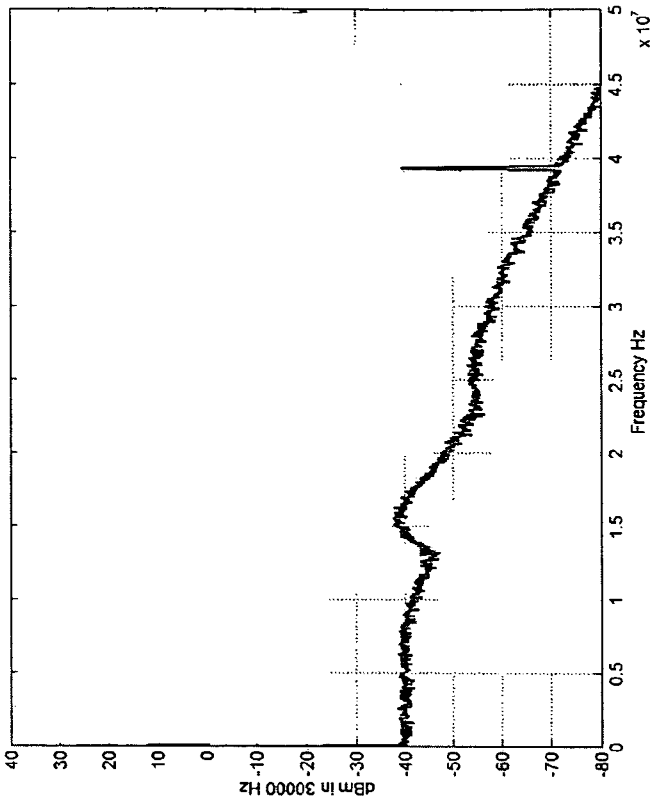
FIGS. 11A and 11B contrast performance of two configurations of power supply.
Figure 11A:
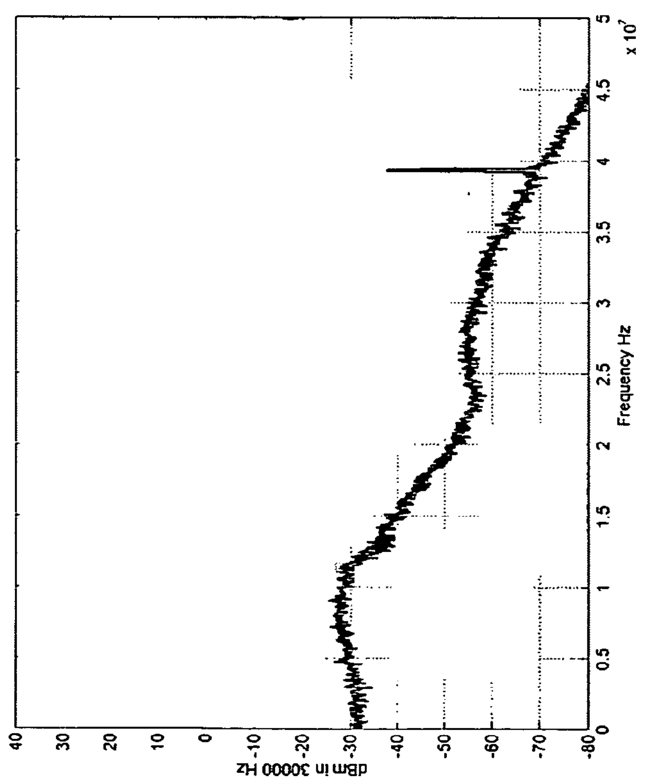

FIG. 11A shows the performance of a 12 phase PWM supply, comprising three coding units in parallel with one another and offset processing (+Q/6 offset to the first coding unit, zero offset to the second coding unit and −Q/6 offset to the third coding unit). There is no feed forward error correction loop. This provides an improvement of around 4.7 dB compared to a 12 phase supply without offset processing. FIG. 11B shows a supply having 8 MSB phases (2 sets of 4 phases in parallel) and a feed-forward error correction stage with 4 phases, as shown in FIG. 4. It will be seen that the coder error is reduced by around 10 dB compared to FIG. 11A, and reduced by a total of 14.7 dB compared to a supply without offset processing or feed-forward error correction.

It will be appreciated that the embodiment described above employs two different techniques: (i) the use of a feed-forward error correction loop and (ii) the use of offset processing and parallel coding units. While the arrangement shown here employs both techniques, each of these techniques can be used by itself. Offset processing can be used without any form of error correction loop and further coding unit. Similarly, the error signal can be derived by comparing the modulating input signal with the coded output of a single phase coding unit, a multi-phase coding unit or several single or multi-phase coding units (as described).

Figure 12:
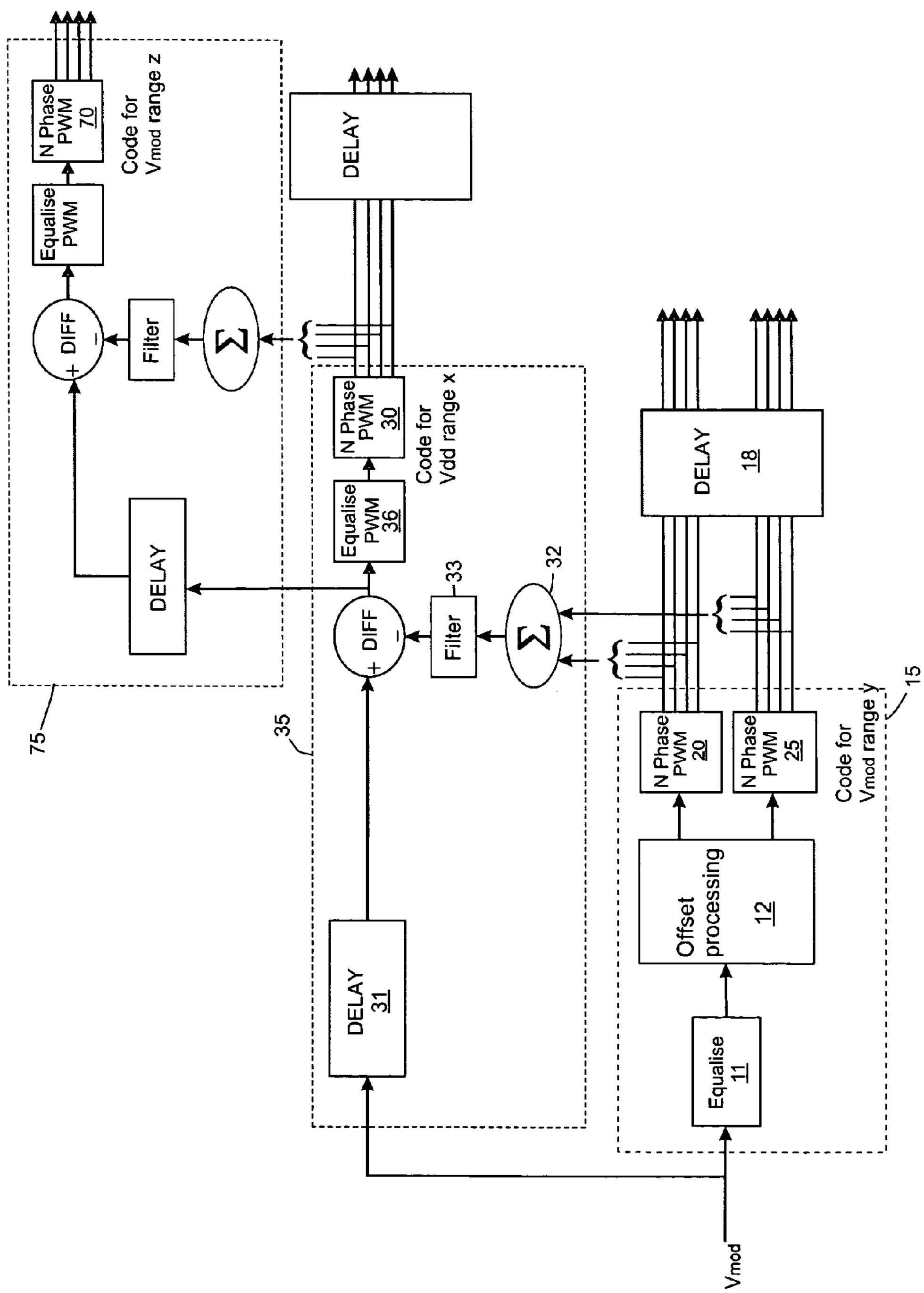
FIG. 12 shows a further modification to the supply.

The arrangement shown in FIG. 4 has a single feed-forward error correction loop. This can be expanded to include a second error correction loop 75. FIG. 12 shows a control stage which includes two N phase stages, a first error correction loop with an N phase coding unit 30, and a second error correction loop with a further 4 phase coding unit 70. The second error correction loop is responsive to the difference between the input to the intermediate stage and the coded output of the intermediate stage. This error has a maximum range of approximately 0–1 V, and would provide a further 6–8 dB performance improvement. Thus, coding unit 70 can code to an even smaller range (higher resolution) than the coding unit 30. In the same manner as described earlier, the filter stage 60 associated with the output of the second error correction loop has an inductor value related to the contribution made by the error signal. The output of the intermediate stage is delayed such that it is time aligned with the output of the other stages. Similarly, the input to the second error correction loop 75 is delayed to compensate for delay introduced by processing in the intermediate stage. It will be appreciated that further correction loops can be added, if desired, to further reduce the error between the modulating input signal and the coded output signal. The total number of stages will be dictated by factors such as the required performance, analog component tolerances, practical component values, available board space and budget.

In a further modification, an additional function of the front-end of the control stage, e.g. as part of processing unit 13, calculates the mean value of the modulating input signal $V_{mod}$ and then applies a real time correction to the value of variable 'c' in blocks 14 and 16 in FIG. 5 and to variable 'f' in FIG. 8 dependent on the mean signal value. This can improve signal/power balance between the main and error phase.

It will be well understood that the functions of the coding units 20, 25, 30 and the control stage 10 as a whole can be implemented by software which is executed by a processor, by hardware such as a FPGA or dedicated integrated circuit, or a combination of these.

The techniques described herein are applicable to the control of modulated power supplies used in a wide range of applications. One particularly suitable application is a base station of a wireless communications system which processes wideband signals such as CDMA, wideband CDMA (W-CDMA) and Orthogonal Frequency Division Multiplexed (OFDM), as the ratio of signal bandwidth to sampling frequency is particularly low.

Figure 13:
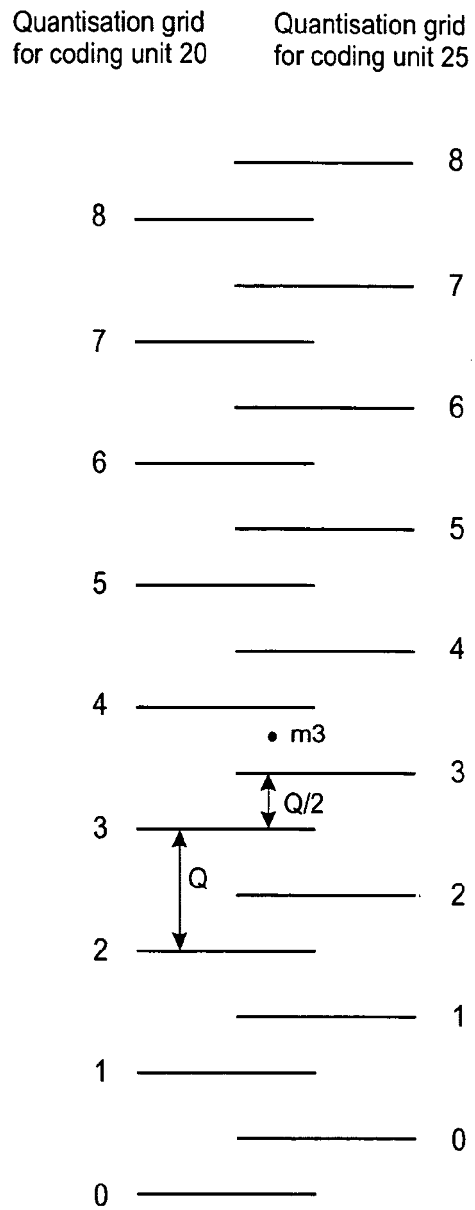
FIG. 13 shows the effect of offsetting the quantisation grids of the coding units.

In the above described embodiment an offset is applied to a modulating input signal to offset the signals applied to coding units 20, 25 by one half of a quantisation step. An equivalent effect can be achieved by offsetting the quantisation grids of the coding units 20, 25. Rather than applying an offset of +/−b (Q/4) to the modulating signal, the same modulating signal is applied to both coding units 20, 25. However, the quantisation grid of one coding unit, i.e. the grid of quantisation levels, is offset from the quantisation grid of the other coding unit. The quantisation grids can be permanently fixed or they may alternate on a periodic basis (e.g. after every N samples for an N phase coding unit) to achieve the same balancing effect as the offset processing. FIG. 13 shows the effect of offsetting the quantisation grids by Q/2. A modulating signal m3 having a value of 3.5 is quantised by coding unit 20 as 4.0 and by coding unit 25 as 3.0, representing an average of 3.5. By applying other values of modulating signal, it can be seen that the maximum quantisation error is Q/4.

Although, for simplicity, only two coding units 20, 25 are shown, the techniques can be readily applied to a set of M coding units which are offset from one another by 1/M of a quantisation level. This can be achieved in any of the ways described, i.e. by offsetting the quantisation grids of the M coding units by 1/M of a quantisation level; by applying a positive offset of 1/2M to half of the modulating signals and a negative offset of 1/2M to the other half of the modulating signals (where M is an even number); or by applying a zero offset to one of the signals, a positive offset of 1/2M to (M−1)/2 of the signals and a negative offset of 1/2M to the other (M−1)/2 of the signals (where M is an odd number).

Figure 14:
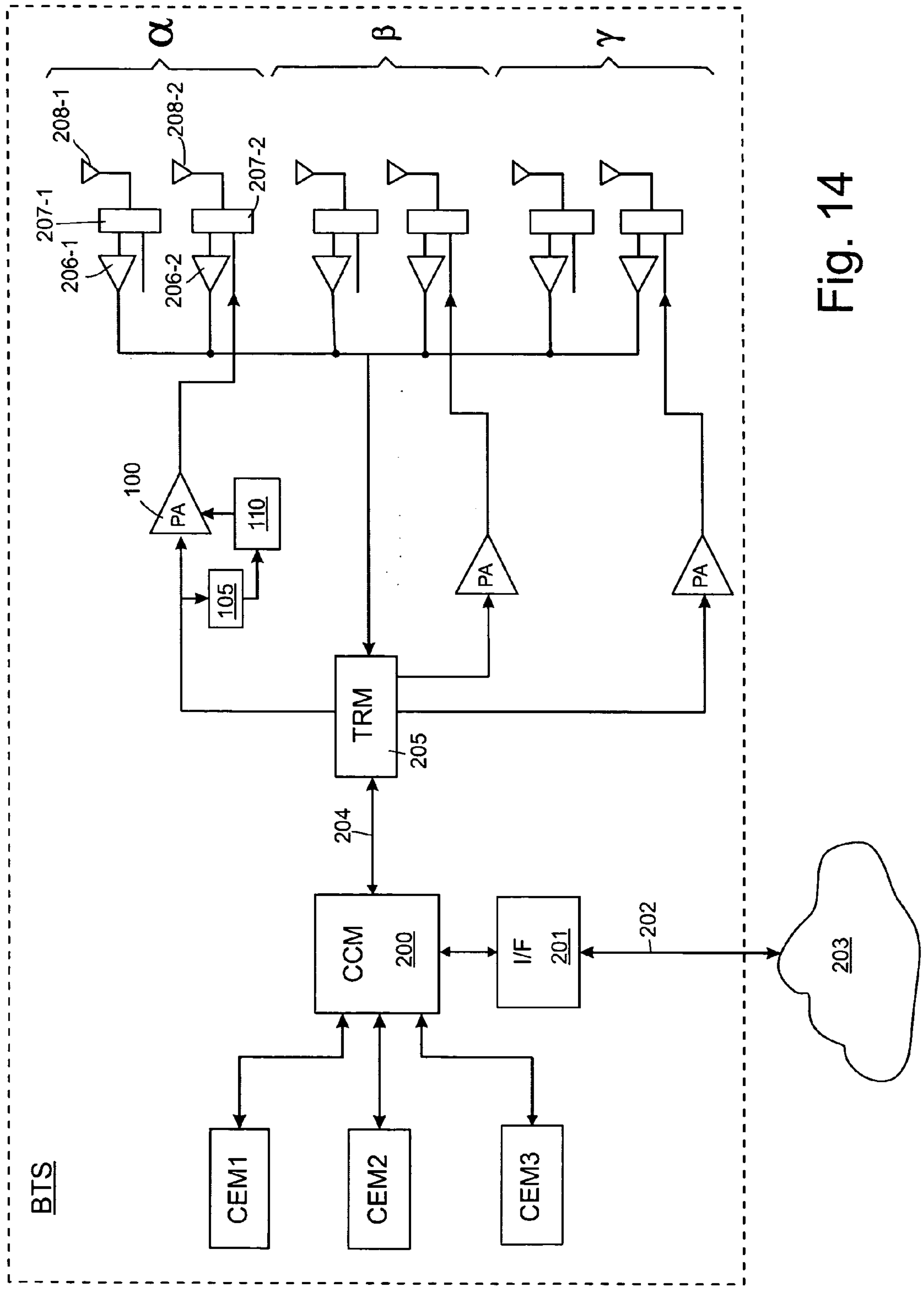
FIG. 14 shows a wireless communications base station incorporating the modulated supply.

FIG. 14 schematically shows a base station for a wireless communications system, in which the invention can be applied. The baseband section of the base station BTS includes a core switch CCM 200, an interface 201 to the operator's network 203 and a plurality of signal processing units CEM1, CEM2, CEM3. Signals in Packet Data Format including user messages and control signals may be provided on a connection 202 between the network 203 and the BTS, the signals being received at the interface 201 and passed from there to the core switch CCM 200. The core switch 200 is responsible for controlling the complete operation of the transmission and reception of signals to and from the antennas 208 and to and from the signal processing units CEM1, CEM2, CEM3 and the interface 201. The signal processing units undertake baseband signal processing. The core switch CCM 200 is connected 204 to a transceiver unit TRM 205. Transceiver unit TRM 205 performs digital to analog conversion and up-conversion to RF for signals to be transmitted, and performs down-conversion from RF and analog-to-digital conversion on received signals. The arrangement shown has three sectors: α, β and γ. In a typical arrangement, different signals will be transmitted in each sector α, β, γ, e.g. in sector α a signal from a transmit unit in TRM 205 is amplified by power amplifier 100, passed through duplexer 207-2 and transmitted from antenna 208-2.

As previously described with respect to FIG. 1, an envelope detector 105 receives the signal which is to be transmitted and detects the envelope of it. The envelope signal forms a modulating signal for the modulated power supply 110. The resulting output from the modulated power supply forms the power supply to the power amplifier 100 such that the power supply tracks the envelope of the signal which is to be transmitted.

An improvement described in a related application U.S. Ser. No. 10/675,771 can also be incorporated to improvement linearity. In this improvement, the position of the output pulses for each phase of the coding units 20, 25, 30 varies. Referring again to FIG. 8, each coding unit generates a pulsed output signal within a time window, with the time window for a coding unit being offset (in this case by Fs) from those for other phases. For phases 1 and 3, the output pulses generated by the respective coding units are aligned with the left hand side (beginning) of their respective windows. This is referred to as 'left justified', i.e. the pulse, whatever width it has, is aligned so that it's left hand edge is aligned with the start of the window. For phases 2 and 4, the output pulses generated by respective coding units are aligned with the right hand side (end) of the respective windows. This is referred to as 'right justified', i.e. the pulse, whatever width it has, is aligned so that it's right hand edge is aligned with the end of the window. Thus, alternate phases are aligned with different ends of their respective window, the phases progressing 'left justified, right justified, left justified, right justified'. Other phases can be added in a similar manner, with the same pattern. It has been found that this variation of the pulse alignment, or justification, can help to reduce distortion.

The invention is not limited to the embodiments described herein, which may be modified or varied without departing from the scope of the invention.

We claim:

1. A control apparatus for a modulated power supply comprising:

an input for receiving a modulating signal;

a first coding unit which is arranged to receive the modulating signal and to generate a first control signal for controlling a first switching stage, the first control signal being related to the value of the modulating signal;

an error determining unit which is arranged to determine an error signal resulting from the difference between the modulating signal and the first control signal;

a second coding unit which is arranged to receive the error signal and to generate a second control signal for controlling a second switching stage, the second control signal being related to the value of the error signal.

2. A control apparatus according to claim 1 wherein the second coding unit has a set of possible coding values which are substantially distributed across the range of the error signal.

3. A control apparatus according to claim 1 wherein the first coding unit comprises a plurality of phases, the first control signal comprises a set of control signals for the phases and the first switching stage comprises at least one switching device per phase.

4. A control apparatus according to claim 3 wherein the error determining unit is arranged to sum contributions of the set of control signals on a periodic basis.

5. A control apparatus according to claim 4 wherein the error determining unit is further arranged to filter the sum of contributions of the set of control signals before comparison with the modulating signal.

6. A control apparatus according to claim 1 wherein the second coding unit comprises a plurality of phases, the second control signal comprises a set of set of control signals for the phases and the second switching stage comprises at least one switching device per phase.

7. A control apparatus according to claim 1 further comprising a time delay element for delaying the modulating signal whereby to time align corresponding parts of the modulating signal and the first control signal.

8. A control apparatus according to claim 1 further comprising a time delay element for delaying the first control signal whereby to time align corresponding parts of the first control signal and the second control signal.

9. A control apparatus according to claim 1 further comprising a third coding unit which is arranged to receive a further error signal formed by the difference between the error signal and the second control signal and to generate a third control signal for controlling a third switching stage, the third control signal being related to the value of the further error signal.

10. A modulated supply incorporating the control apparatus of claim 1.

11. A modulated power supply according to claim 10 wherein each coding unit has an output stage which includes an inductor and wherein the value of the inductor is proportional to the relative ranges of the first and second coding units.

12. A modulated power supply according to claim 11 wherein at least one of the first and second coding units comprises a plurality of phases and the value of the inductor is further proportional to the relative number of phases in the first and second coding units.

13. A modulated power supply according to claim 10 wherein the modulating input signal is an envelope of a signal for processing by a power amplifier and an output of the power supply forms a power supply for the power amplifier.

14. A power amplifier comprising an amplifying device and a modulated power supply according to claim 10, wherein the amplifying device has an input for receiving an input signal for amplification, wherein an envelope level of the input signal is fed to the power supply as the modulating input signal and an output of the power supply forms a power supply for the power amplifier.

15. A wireless base station comprising a power amplifier according to claim 14.

16. A method of generating a power supply signal using a modulated power supply comprising:

receiving a modulating signal;

receiving the modulating signal at a first coding unit and generating a first control signal for controlling a first switching stage, the first control signal being related to the value of the modulating signal;

determining an error signal resulting from the difference between the modulating signal and the first control signal;

receiving the error signal and generating a second control signal for controlling a second switching stage, the second control signal being related to the value of the error signal.

17. A power supply signal resulting from the method of claim 16.

18. A computer program product for implementing a method of controlling operation of a modulated power supply, the computer program product comprising instructions which are arranged to cause a control apparatus of the supply to:

receive a modulating signal;

receive the modulating signal and generate a first control signal for controlling a first switching stage, the first control signal being related to the value of the modulating signal;

determine an error signal resulting from the difference between the modulating signal and the first control signal;

receive the error signal and generate a second control signal for controlling a second switching stage, the second control signal being related to the value of the error signal.

* * * * *